(12) United States Patent
Forbes et al.

(10) Patent No.: US 12,709,557 B2
(45) Date of Patent: Aug. 18, 2026

(54) HIGHLY CONFIGURABLE ADAPTABLE MOBILE DEIONIZATION TRAILER

(71) Applicant: Evoqua Water Technologies LLC, Pittsburgh, PA (US)

(72) Inventors: John David Forbes, Midlothian, VA (US); Kodi Marlan Killion, Chesterfield, VA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 891 days.

(21) Appl. No.: 17/880,193

(22) Filed: Aug. 3, 2022

(65) Prior Publication Data

US 2023/0038514 A1 Feb. 9, 2023

Related U.S. Application Data

(60) Provisional application No. 63/229,122, filed on Aug. 4, 2021.

(51) Int. Cl.

| | |
|---|---|
| ***C02F 1/42*** | (2023.01) |
| ***B01D 15/36*** | (2006.01) |
| ***C02F 1/00*** | (2023.01) |

(52) U.S. Cl.

CPC .............. *C02F 1/42* (2013.01); *B01D 15/361* (2013.01); *C02F 1/006* (2013.01); *C02F 1/008* (2013.01); *C02F 2201/005* (2013.01); *C02F 2201/008* (2013.01); *C02F 2209/03* (2013.01); *C02F 2209/05* (2013.01); *C02F 2209/40* (2013.01)

(58) Field of Classification Search

CPC .. C02F 1/42; C02F 1/006; C02F 1/008; C02F 2201/005; C02F 2201/008; C02F 2209/03; C02F 2209/05; C02F 2209/40; C02F 2209/005; C02F 2209/04; B01D 15/361

See application file for complete search history.

(56) References Cited

U.S. PATENT DOCUMENTS 3,224,586 A * 12/1965 Wade ........................ G21F 9/06 210/477

4,297,209 A * 10/1981 DeVisser ............... B01D 29/92 210/411

(Continued)

OTHER PUBLICATIONS

Hassan et al., Modeling the Uniformity of Manifold with Various Configurations, 2014, Hindawi Publishing Corporation, p. 1-8 (Year: 2014).*

*Primary Examiner* — Amber R Orlando

(57) ABSTRACT

Systems for treating water, e.g., mobile deionization systems, are disclosed. The system includes a system inlet connectable to a source of water to be treated; a water distribution manifold connected to the system inlet and including a plurality of valves structured and arranged to provide a configurable flow path along the water distribution manifold; a plurality of water treatment vessels each having an inlet and an outlet connected to the water distribution manifold; and a system outlet connected to the outlet of a last of the plurality of water treatment vessels. The plurality of valves are selectively operable to provide for sections of the water distribution manifold to switch between flowing water into one or more of the plurality of water treatment vessels or receiving water from the one or more of the plurality of water treatment vessels. Methods of treating water using the systems are also disclosed.

23 Claims, 5 Drawing Sheets

(56) References Cited

U.S. PATENT DOCUMENTS

| | | | | |
|---|---|---|---|---|
| 4,383,920 | A * | 5/1983 | Muller | B01D 35/14<br>210/93 |
| 9,126,852 | B2 * | 9/2015 | Oberholtzer | B01D 15/00 |
| 11,542,178 | B1 * | 1/2023 | Chandler, Jr. | C02F 1/78 |
| 2006/0243059 | A1 * | 11/2006 | Williams | G01F 1/115<br>73/861 |
| 2008/0087606 | A1 * | 4/2008 | Jensen | B01J 49/85<br>210/678 |
| 2008/0283467 | A1 * | 11/2008 | Nguyen | C02F 1/325<br>210/600 |
| 2022/0371914 | A1 | 11/2022 | Keis et al. | |

* cited by examiner 108
104_4
104_3

103a
104_2
104_1
100
101
102
103b

HIGHLY CONFIGURABLE ADAPTABLE MOBILE DEIONIZATION TRAILER

CROSS-REFERENCE TO RELATED APPLICATIONS

This application claims priority under 35 U.S.C. § 119(e) to U.S. Provisional Application Ser. No. 63/229,122, titled “Highly Configurable Adaptable Mobile Deionization Trailer,” filed on Aug. 4, 2021, the disclosure of which is incorporated herein by reference in its entirety for all purposes.

FIELD OF TECHNOLOGY

Aspects and embodiments disclosed herein are generally related to the field of the deployable water treatment systems using ion exchange.

SUMMARY

In accordance with one aspect, there is provided a water treatment system. The system includes a system inlet connectable to a source of water to be treated and a water distribution manifold connected to the system inlet. The water distribution manifold includes a plurality of valves structured and arranged to provide a configurable flow path along the water distribution manifold. The system further includes plurality of water treatment vessels each having an inlet and an outlet connected to the water distribution manifold. The plurality of water treatment vessels are structured and arranged to provide for a uniform pressure drop across the plurality of water treatment vessels. The plurality of valves are selectively operable to provide for sections of the water distribution manifold to switch between flowing water into one or more of the plurality of water treatment vessels or receiving water from the one or more of the plurality of water treatment vessels. The system additionally includes a system outlet connected to the outlet of a last of the plurality of water treatment vessels.

In further embodiments, the plurality of valves are selectively operable to provide for the configurable flow path to be modified to change connections between the plurality of water treatment vessels from series to parallel and from parallel to series. In certain embodiments, the plurality of valves permit the plurality of water treatment vessels to be divided into two or more groups each comprising a subset of the plurality of water treatment vessels. For example, the plurality of valves may permit the plurality of water treatment vessels to be divided into two groups of vessels, three groups of vessels, four groups of vessels, or more.

In some embodiments, the plurality of water treatment vessels include one or more ion exchange media. In specific embodiments, the one or more ion exchange media include one or more of cation exchange media, anion exchange media, and mixed ion exchange media.

In further embodiments, the system includes a controller in operative communication with the plurality of valves and/or each of the plurality of water treatment vessels. In certain embodiments, the controller is configured to operate, e.g., selectively operate, the plurality of valves to create two or more groups, e.g., two groups of vessels, three groups of vessels, four groups of vessels, or more, from the plurality of water treatment vessels.

In some embodiments, a first group of the plurality of water treatment vessels is connected to a first header fluidly coupled to the water distribution manifold and a second group of the plurality of water treatment vessels is connected to a second header fluidly coupled to the water distribution manifold.

In some embodiments, the controller is operatively coupled to one or more sensors disposed at the system inlet, one or more sensors disposed at the system outlet, and/or one or more sensors disposed at the inlets or outlets of the plurality of water treatment vessels. The one or more sensors may include, but are not limited to, a pressure sensor, a flow sensor, a conductivity sensor, a total organic content (TOC) sensor, a turbidity sensor, a chemical species-specific sensor, or a combination thereof. In certain embodiments, the one or more sensors disposed at the system inlet and system outlet include pressure sensors constructed and arranged to measure a pressure differential across the water treatment system. In certain embodiments, the one or more sensors disposed at the inlets or outlets of the plurality of water treatment vessels include pressure sensors constructed and arranged to measure a pressure differential across one or more of the plurality of water treatment vessels. For example, the controller may be configured to operate one or more of the plurality of valves responsive to measurements from the plurality of pressure sensors to direct water away from one or more of the plurality of water treatment vessels where the pressure differential across a water treatment vessel exceeds a predetermined threshold.

In some embodiments, the one or more sensors disposed at the system inlet and system outlet include flow sensors constructed and arranged to measure a flow of water discharged from the water treatment system. In some embodiments, the one or more sensors disposed at the inlets or outlets of the plurality of water treatment vessels include flow sensors constructed and arranged to measure a flow of water from one or more of the plurality of water treatment vessels. The controller may be configured to operate one or more of the plurality of valves responsive to measurements from the flow sensors disposed at the inlets or outlets of the plurality of water treatment vessels to direct water away from one or more of the plurality of water treatment vessels where a flow rate from the outlet is below a predetermined threshold.

In some embodiments, the controller is configured to determine an estimated time remaining to exhaustion of the water treatment system and/or each of the plurality of water treatment vessels responsive to a measurement from the one or more sensors. For example, the controller may be configured to operate one or more of the plurality of valves responsive to the determination of exhaustion to direct water away from any water treatment vessel that is exhausted.

In accordance with another aspect, there is provided a method of treating water. The method includes providing a water treatment system. The provided water treatment system includes a water distribution manifold connected to a system inlet and system outlet and has a plurality of valves structured and arranged to provide a configurable flow path along the water distribution manifold. The provided water treatment system further includes a plurality of water treatment vessels each having an inlet and an outlet connected to the water distribution manifold. The water distribution manifold provides for a uniform pressure drop across the plurality of water treatment vessels. The plurality of valves are selectively operable to provide for sections of the water distribution manifold to switch between flowing water into one or more of the plurality of water treatment vessels or receiving water from the one or more of the plurality of water treatment vessels. The method includes measuring one or more water quality parameters from water from a source of water to be treated that is directed to the system inlet. The method further includes configuring a flow path of the water to be treated responsive to the one or more water quality parameters of the water to be treated. The method further includes treating the water to be treated using the plurality of water treatment vessels. The method additionally includes discharging a treated water from the system outlet.

In some embodiments, measuring one or more water quality parameters includes measuring one or more of water pressure, flow rate, conductivity, TOC, turbidity, a concentration of one or more chemical species, or a combination thereof.

In some embodiments, the method includes passing the water through water treatment vessels having one or more ion exchange media. In specific examples, the method includes passing the water through two or more groups of the plurality of water treatment vessels divided by the plurality of valves. The two or more groups of the plurality of water treatment vessels may include the same type of water treatment media. In specific embodiments, the method includes passing the water through the plurality of water treatment vessels arranged serially. Alternatively, in certain embodiments, the method includes passing the water through the plurality of water treatment vessels arranged in parallel.

In some embodiments, the method includes passing the water through the two or more groups of the plurality of water treatment vessels where the two or more groups have different types of water treatment media. In specific embodiments, the method includes passing the water through the plurality of water treatment vessels arranged serially. Alternatively, in certain embodiments, the method includes passing the water through the plurality of water treatment vessels arranged in parallel.

In further embodiments, the method includes configuring the flow path using the plurality of valves to direct water into a first group of water treatment vessels having a first water treatment media followed by a second group of water treatment vessels having a second water treatment media different than the first water treatment media.

In further embodiments, the method includes configuring the flow path using the plurality of valves to direct water into a first group of water treatment vessels followed by a second group of water treatment vessels, the first group of water treatment vessel comprising fewer water treatment vessels than the second group of water treatment vessels.

In further embodiments, the method includes configuring the flow path using the plurality of valves to direct water from the second group of water treatment vessels to a third group of water treatment vessels, the third group of water treatment vessel comprising fewer water treatment vessels than the second group of water treatment vessels.

In further embodiments, the method includes configuring the flow path using the plurality of valves to direct water into a first group of water treatment vessels followed by a second group of water treatment vessels, the first group of water treatment vessel comprising a greater number of water treatment vessels than the second group of water treatment vessels.

In further embodiments, the method includes configuring the flow path using the plurality of valves to direct water from the second group of water treatment vessels to a third group of water treatment vessels, the third group of water treatment vessel comprising a greater number of water treatment vessels than the second group of water treatment vessels.

In some embodiments, the method includes configuring the flow path using the plurality of valves to direct water away from water treatment vessels having exhausted treatment capacity.

In accordance with another aspect, there is provided a configurable mobile deionization system. The system includes a system inlet connectable to a source of water to be treated. The system further includes a first group of water treatment vessels comprising anion exchange resin on a first header and a second group of water treatment vessels comprising cation exchange resin on a second header. The system further includes a water distribution manifold fluidly connected to the system inlet, the first header, and the second header. The water distribution manifold includes a plurality of valves selectively operable to provide a configurable flow path that directs water between the first header and the second header. The system additionally includes a system outlet connected to an outlet of the first header or the second header.

In accordance with another aspect, a method of facilitating water treatment is disclosed. The method includes providing a water treatment train disposed on a mobile trailer, the water treatment train including a plurality of water treatment vessels, each of the water treatment vessels containing one of a plurality of types of treatment media. Each of the water treatment vessels includes respective inlets fluidly couplable to a first manifold header and to a second manifold header of a water distribution manifold and respective outlets fluidly couplable to the first manifold header and to the second manifold header of the water distribution manifold. The first manifold header includes a first isolation valve disposed to fluidly isolate respective inlets of a first group of the water treatment vessels and a second isolation valve disposed to fluidly isolate respective inlets of a third group of water treatment vessels. The second manifold header includes a third isolation valve disposed to fluidly isolate respective inlets of a second group of water treatment vessels. The method further includes selecting a plurality of water treatment vessels to be the first group of water treatment vessels based on the type of treatment media contained therein, selecting a plurality of water treatment vessels to be the second group of water treatment vessels based on the type of treatment media contained therein, and selecting a plurality of water treatment vessels to be the third group of water treatment vessels based on the type of treatment media contained therein. The method further includes coupling the water distribution manifold to a source of water to be treated at a first treatment site and establishing a first fluid circuit of the water to be treated through the first group of water treatment vessels, then through the second group of water treatment vessels, and then through the third group of water treatment vessels.

In some embodiments, at least a portion of the plurality of water treatment vessels are charged with treatment media at the first treatment site.

In some embodiments, the method further includes moving the mobile trailer to a second treatment site, coupling the water distribution manifold to a second source of water to be treated at the second treatment site, and establishing a second fluid circuit of the water to be treated through the second group of water treatment vessels and then through one of the first group of water treatment vessels and the third group of water treatment vessels.

In some embodiments, at least a portion of the plurality of water treatment vessels are charged with treatment media at the second treatment site.

In some embodiments, the second manifold header further includes a fourth isolation valve disposed to fluidly isolate respective inlets of a fourth group of water treatment vessels.

In some embodiments, the method further includes selecting a plurality of water treatment vessels to be the fourth group of water treatment vessels based on the type of treatment media contained therein.

In some embodiments, establishing the first fluid circuit of the water to be treated further includes directing water through the fourth group of water treatment vessels after the water is directed through the third group of water treatment vessels.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing. In the drawings.

DETAILED DESCRIPTION

Figure 1:
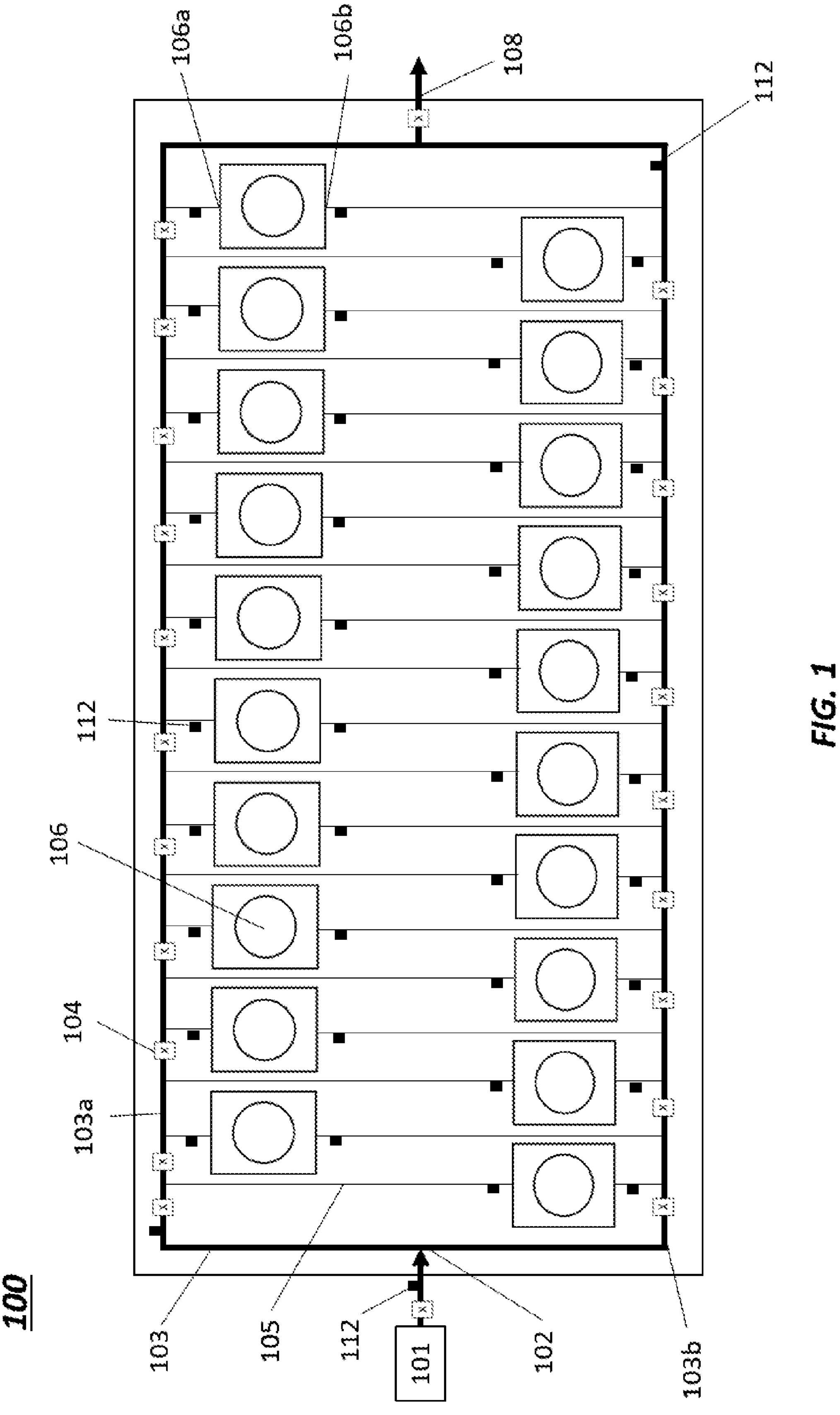
FIG. 1 illustrates an embodiment of a mobile water treatment system, according to an embodiment.

Wastewater and water may be treated for a variety of reasons, depending on the contents of the water or wastewater and its intended use. Water used in industrial applications, for example heat exchangers, cooling towers, desalination systems, cleaning systems, pipelines, gas scrubber systems, refineries and associated equipment often contains various ionic impurities, even if the source of water is from a treated municipal source. The ionic impurities may combine and form precipitates due to the pH, pressure, or temperature in the system or the presence of additional ions with which they form insoluble products. Such water and wastewater may be subject to ionic pollution that may be a threat to ecological balance. Ground water and wastewater, if not properly treated, often contain undesirable impurities.

Water may be too "hard" for certain applications due to excess calcium, magnesium, and carbonate ions, which may react with phosphate, sulfate, or silicate ions and form insoluble salts. Deionized (DI) water is an ingredient in hundreds of applications, including medical, laboratory processes, pharmaceuticals, cosmetics, electronics manufacturing, food processing, plating, countless industrial processes, and even the spot-free rinse water at the local car wash. Typically, it serves as an ultra-pure ingredient, a cleaning solvent, or as the foundation of a process water recovery/reuse strategy. Deionized water meeting Water-For-Injection (WFI) standards of purity is used as the basis for saline and other solutions to be injected into the body during medical procedures. Its bacteria-free and mineral-free purity helps assure the quality and stability of the solution as other ingredients are added to it. DI laboratory water is typically used to clean instruments and lab equipment and to perform tissue cell culture, blood fractionation, and other lab procedures. Deionized water in the pharmaceutical industry is used for preparing culture media, for making up aqueous solutions, and for washing containers and apparatus. It is also used as a raw material, ingredient, and solvent in the processing, formulation, and manufacture of pharmaceutical and nutraceutical products, active pharmaceutical ingredients (APIs) and intermediates, compendial articles, and analytical reagents. In semiconductor manufacturing, deionized water's properties for absorbing minerals, enhancing detergents and residue-free drying make it useful for rinsing and cleaning semiconductor wafers. It is also used in wet etching, bacterial testing and many other processes throughout the fabrication facility. Deionized water is commonly used to top up lead-acid batteries, cooling systems, and for other applications. Deionized water is often used as an ingredient to add purity, stability, and performance in many hair care, skin care, body care, baby care, sun care, and makeup products, where it is sometimes referred to as "aqua" on product ingredient labels. Because of its high relative dielectric constant, deionized water is used as a high voltage dielectric in many pulsed power applications for energy research. Deionized water is used as both an ingredient and a process element in food and beverage processing. As an ingredient, it offers stability, purity, and sanitation. As a process element, it is used for effective sanitation. In industrial plants, DI water facilitates water and wastewater recycling; it adds efficiency and life extension to boiler and steam processes. Deionized water is used to pretreat boiler feed water to reduce scaling and energy use and to control deposition, carryover, and corrosion in the boiler system. As such, DI water is an essential element in boiler water recycling. Deionized water can pretreat cooling tower make-up water to help reduce scaling and reduce energy use in power plants, petroleum refineries, petrochemical plants, natural gas processing plants, food processing plants, semiconductor plants, and other industrial facilities. When used as a rinse after washing cars, windows, and similar applications, deionized spot-free rinse water dries without leaving spots caused by dissolved solutes, eliminating post-wash wipe downs.

A general deionization process includes the use of ion exchange, e.g., cation and anion, exchange resins. Ion exchange is the reversible interchange of ions between a solid (for example, an ion exchange resin) and a liquid (for example, water). Since ion exchange media act as "chemical sponges," they are well suited for effective removal of contaminants from water and other liquids. Generally speaking, the ion exchange resin is contained in a treatment vessel through which the water to be treated is passed. As the water passes through and around the ion exchange resin, ions in the fluid to be processed are exchanged with ions found in the resin, thereby removing undesired ions from the fluid and exchanging them for less impactful ions, such as sodium ions, found in the resin. However, as ions are exchanged, the efficacy of the resin is reduced. Eventually, a steady state is reached in which no further undesirable ions in the water to be treated can be exchanged for the less impactful ions found in the resin. Ion exchange resins may be regenerated by removing the undesirable ions from the resin and replacing these with the original ions on the resin, a process known as regeneration. During regeneration, a substance having a high concentration of the original ions found on the resin, such as a brine solution, is applied to the ion exchange resin. Because this produces a new balance of concentrations between the respective ions, the ion exchange resin now exchanges the undesirable ions captured during the service cycle for the less impactful ions applied during regeneration process. As a result of this process, the ability of the ion exchange resin to remove undesired ions from the water to be treated is restored.

However, the regeneration process can be relatively lengthy, and during regeneration the treatment vessel being regenerated is off-line and is not treating water. Accordingly, it is desirable to utilize systems and methods that permit water treatment systems to be minimally impacted by the need to regenerate ion exchange resins.

Certain applications do not require a permanent treatment facility. Accordingly, there is a need for temporary or mobile systems that can be delivered to a location requiring treatment of the water, used to the treatment capacity, and removed from the location. Such mobile systems often face the same drawbacks as larger systems inasmuch as the systems must spend time off-line to regenerate the ion exchange resin. Accordingly, systems and methods that permit mobile systems to be minimally impacted by the need to regenerate ion exchange resins are desirable.

Ion exchange resins come in many different forms and chemistries. Some ion exchange resins include a crosslinked polystyrene matrix. Ion exchange sites are introduced to the matrix after polymerization. The crosslinked polymer matrix typically has a relatively uniform distribution of ion exchange sites throughout the structure. Ion exchange resins may be anion exchange resins or cation exchange resins. Anion exchange resins have a positively charged matrix structure that attracts and adsorbs negatively charged ions or molecules and releases positively charged ions or molecules. Cation exchange resins have a negatively charged matrix structure that attracts and adsorbs positively charged ions or molecules and releases negatively charged ions or molecules.

The adsorption of the ions or molecules to the ion exchange resin is driven by the ionic interaction between the oppositely charged ions or ionic groups in the sample molecule and in the functional groups of the resin. The strength of the interaction is determined by the charge of the ion or number and location of the charges on the molecule to be adsorbed and on the number and location of the charges on the functional groups. Functional groups determine the four main types of ion exchange resins. The four main types of ion exchange resins are strongly acidic, strongly basic, weakly acidic, and weakly basic ion exchange resins.

Some weak acid cation exchange resins are based on acrylic or methacrylic acid that has been crosslinked with a di-functional monomer. Weak acid resins may be regenerated with strong acids. The acid-regenerated resin exhibits a high capacity for alkaline earth metals and more limited capacity for the alkali metals.

Weak base anion exchange resins do not contain exchangeable ionic sites and function as acid adsorbers. These resins are capable of adsorbing strong acids with a high capacity and are readily regenerated with a caustic solution. They are particularly effective when used in combination with a strong base anion exchange resin because the combination provides an overall high operating capacity and regeneration efficiency. In some embodiments, a weak base anion exchange resin may be used upstream of a strong base anion exchange resin. In some embodiments, the combination of weak base anion exchange resin and strong base anion exchange resin may be a mixture of weak base anion exchange resins and strong base anion exchange resins. A mixture of strong base anion exchange resin and weak base anion exchange resin may be used in, for example, salt splitting. One example of salt splitting is the process of decomposing the salts of carboxylic acids into their corresponding acid and base compounds. Strong base anion resins are classed as Type 1 and Type 2. Type 1 is a quaternary amine product made by the reaction of a trialkylamine, for example, trimethylamine with a copolymer after chloromethylation. The Type 1 functional group is the most strongly basic functional group available and has the greatest affinity for weak acids, for example, silicic acid and carbonic acid, that are present during some water demineralization processes. However, the efficiency of regeneration of the resin to the hydroxide form is somewhat lower, particularly when the resin is exhausted with monovalent anions, such as chloride and nitrate. The regeneration efficiency of a Type 2 resin is considerably greater than that of Type 1. Type 2 functionality is obtained by the reaction of styrene-DVB copolymer with dimethylethanolamine. This quaternary amine has lower basicity than that of the Type 1 resin, yet it is high enough to remove the weak acid anions for most applications. The chemical stability of the Type 2 resins is not as good as that of the Type 1 resins, the Type 1 resins being favored for high temperature applications.

In an embodiment, the ion exchange resin comprises chromatographic resins of various cross-linkage. In some embodiments, the ion exchange resin comprises quaternary styrene divinylbenzene copolymer resins, for example, quaternary amine styrene divinylbenzene copolymers with uniform fine mesh particle size. In some embodiments, the ion exchange resin comprises anion exchange resin. For example, the anion exchange resin may be any commercially available anion exchange resin.

In alternative embodiments, the ion exchange resin comprises cation exchange resin. For example, the cation exchange resin may be any commercially available cation exchange resin.

In certain non-limiting embodiments, this disclosure describes water treatment systems, e.g., suitable for mobile deployment to a specific site or location needing water treatment. The system may include a system inlet connectable to a source of water to be treated. The system may include a water distribution manifold connected to the system inlet. The water distribution manifold can include a plurality of valves structured and arranged to provide a configurable flow path along the water distribution manifold. The system further may include plurality of water treatment vessels each having an inlet and an outlet connected to the water distribution manifold. The plurality of water treatment vessels may be structured and arranged to provide for a uniform pressure drop across the plurality of water treatment vessels. The plurality of valves may be selectively operable to provide for sections of the water distribution manifold to switch between flowing water into one or more of the plurality of water treatment vessels or receiving water from the one or more of the plurality of water treatment vessels. The system additionally may include a system outlet connected to the outlet of the last of the plurality of water treatment vessels.

An embodiment of a water treatment system suitable for, e.g., use in a mobile treatment, e.g., deionization, system is illustrated in FIGS. 1-4. In FIGS. 1-4, system 100 includes a source of water 101 connectable to a system inlet 102 of the water treatment system 100. The system inlet 102 of the water treatment system 100 is connected to water distribution manifold 103 that includes a first header **103*a* and a second header 103*b*. Systems having one water distribution manifold 103 permit water to be directed along the manifold without uneven pressure drops along the distribution path, i.e., the water distribution manifold 103 is self-hydraulically balanced such that any flow path that water takes through the system 100 has an equal pressure drop. The equal pressure drop across all flow paths creates even water distribution to ensure that each water treatment vessel 106 within system 100 is utilized to capacity, i.e., maximum efficiency and efficacy. In previous systems, e.g., systems with multiple manifolds, treatment capacity was limited to the flow path of least resistance which would exhaust first, causing a decrease in treatment capacity and lower water quality, resulting in increased system downtime and costs. Positioned along the length of the first header 103***a* and second header 103*b* are a plurality of valves 104 (i.e., isolation valves) that serve to define the water distribution manifold 103 into a number of sections. The plurality of valves 104 can be independently and selectively operated to define one or more configurable flow paths along water distribution manifold 103. For example, the plurality of valves 104 can be selectively operable to provide a configurable flow path that directs water between the first header 103*a* and the second header 103*b*. Treated water can be discharged from system outlet 108. The system outlet 108 may be connected to the outlet 106*b* of the last of the plurality of water treatment vessels 106 on the second header 103*b*.

The system 100 includes a plurality of water treatment vessels 106, each having an inlet 106*a* and an outlet 106*b* connected to the first header 103*a* and second header 103*b* of the water distribution manifold 103. As illustrated, the outlet 106*b* of each of the plurality of water treatment vessels 106*b* is fluidly connected to the first header 103*a* and/or second header 103*b* by conduits 105. Note that the illustrated configuration is but one possible configuration, and other connections and flow paths between the plurality of water treatment vessels are contemplated by this disclosure, e.g., the inlets 106*a* and outlets 106*b* of each of the plurality of water treatment vessels 106 are not strictly defined as such. The plurality of water treatment vessels 106 include one or more separation media, such as one or more types of ion exchange media as disclosed herein, e.g., one or more of cation exchange media, anion exchange media, and mixed ion exchange media. The type of media in each vessel can be chosen based on the quality of water desired and the composition of the water to be treated. In a non-limiting example, feed water having an elevated concentration of calcium and magnesium species, i.e., "hard" water, can be treated using a cation exchange resin by replacing calcium and magnesium ions with sodium ions. Other types of ion exchange treatments are contemplated by this disclosure, and this disclosure is not limited to the type of ion exchange media present in the plurality of water treatment vessels 106. In some embodiments, each of plurality of water treatment vessels 106 can include the same type of water treatment media, e.g., the same ion exchange media. Alternatively, the plurality of water treatment vessels 106 can include different types of water treatment media chosen based on desired water quality or feed water composition. One of skill in the art would be able to determine appropriate choices for the water treatment media of the plurality of water treatment vessels 106. Further in addition, the water treatment media of the plurality of water treatment vessels 106 is not limited to ion exchange media. Any suitable water treatment media may be used in the system 100, such as activated carbon, inorganic media, e.g., activated aluminum, sand, or perlite, metallic media, and other related media types.

With continued reference to FIGS. 1-4, the plurality of valves 104 are selectively operable to provide for sections of the water distribution manifold 103 to switch between flowing water into one or more of the plurality of water treatment vessels 106 or receiving water from the one or more of the plurality of water treatment vessels 106. In a non-limiting example, the plurality of valves 104 can be operated in a manner, e.g., by selectively closing and opening, to provide for the configurable flow path along the water distribution manifold 103 to be modified to change connections between the plurality of water treatment vessels 106 from series to parallel and from parallel to series. Without wishing to be bound by any particular theory, modification of the configurable flow path to independently change connections between the plurality of water treatment vessels 106 from series to parallel and from parallel to series permits operation of the system 100 in a manner that optimizes treatment efficiency, resulting water quality, and lifespan of consumable materials, e.g., ion exchange media.

In some embodiments, the plurality of valves are configured into a flow path prior to the system being deployed at a location, e.g., by manually operating the plurality valves to set the flow path. In other embodiments, the system 100 includes a controller in operative communication with the plurality of valves 104 and/or each of the plurality of water treatment vessels 106 to direct their general operation. In general, the controller may by constructed and arranged, e.g., programmed, to operate the system 100 in a dynamic fashion, i.e., adjusting one or more system 100 components based on input received from a sensor or another data collection component. The controller is configured to operate the plurality of valves 104 to create the two or more groups from the plurality of water treatment vessels 106 as described herein. In some embodiments, the controller is configured to close one or more of the plurality of valves 104 to define an individual group, e.g., a group of water treatment vessels 106 connected in series, and open one more of the plurality of valves 104 to permit water to flow between individual groups connected in parallel. For example, as illustrated by the flow arrows in FIGS. 2-4, one or more of the plurality of valves 104 can be operated to permit the water to flow in a serpentine pattern between the two groups of water treatment vessels 106, three groups of water treatment vessels 106, or four groups of water treatment vessels 106, respectively.

The controller can be operatively coupled to one or more sensors 112 disposed at the system inlet 102, one or more sensors 112 disposed at the system outlet 108, and/or one or more sensors 112 disposed at the inlets 106*a* or outlets 106*b* of the plurality of water treatment vessels 106. The one or more sensors 112 in general provide operational information about the performance of the system 100 and can be used to determine when maintenance of the system 100 is needed. As illustrated in FIGS. 1-4, the one or more sensors can be positioned at the inlet 106*a* and outlet 106*b* of each of the plurality of water treatment vessels 106, in addition to one or more sensors at the system inlet 102 and system outlet 108. The location of the one or more sensors 112 shown in FIG. 1 is only one embodiment, and the system 100 can include fewer sensors than illustrated, and this disclosure is in no way limited by the number of sensors 112 positioned within the system 100. In some embodiments, the one or more sensors 112 disposed at the system inlet 102, system outlet 108, and the inlets 106*a* or outlets 106*b* of the plurality of water treatment vessels 106 can include one or more of a pressure sensor, a flow sensor, a conductivity sensor, a TOC sensor, a temperature sensor, a turbidity sensor, a chemical species-specific sensor, or a combination thereof. In a non-limiting embodiment, the one or more sensors 112 at the system inlet 102 can be used to measure the composition of the water entering the system 100, e.g., composition, conductivity, temperature, flow, pressure, or TOC, and these types of measurements can be used to determine the flow rate and residence time needed to obtain the desired water quality of the treated water. The one or more sensors 112 can be used to measure aggregate properties of the system 100 and/or can be used to measure one or more properties of an individual water treatment vessel in the plurality of water treatment vessels 106. At the system inlet 102, one or more sensors for pressure and/or flow can be used to determine if the system 100 has a blockage or other flow-limiting condition indicating that the system 100 is in need of maintenance. Similarly, at the system outlet 108, one or more sensors for chemical composition, pressure, and/or flow can be used to determine if the system 100 is not producing treated water of sufficient quality or there is a blockage or other flow-limiting condition indicating that the system 100 is in need of maintenance. Thus, in some embodiments, the one or more sensors 112 disposed at the system inlet 102 and system outlet 108 include pressure sensors constructed and arranged to measure a pressure differential across the water treatment system 108. Alternatively, or in addition, the one or more sensors disposed at the inlets 106*a* or outlets 106*b* of the plurality of water treatment vessels 106 include pressure sensors constructed and arranged to measure a pressure differential across one or more of the plurality of water treatment vessels 106. Responsive to the measurements of pressure sensors 112 disposed at the system inlet 102, system outlet 108, and the inlets 106*a* or outlets 106*b* of the plurality of water treatment vessels 106, the controller 110 can operate one or more of the plurality of valves 104 to direct water away from one or more of the plurality of water treatment vessels 106 where the pressure differential across a water treatment vessel exceeds a predetermined threshold.

In addition to pressure sensors at the system inlet 102, system outlet 108, and the inlets 106*a* or outlets 106*b* of the plurality of water treatment vessels 106, the one or more sensors 112 may include flow sensors. Flow sensors useful the systems of this disclosure can be constructed and arranged to measure a flow of water discharged from the water treatment system 100 in aggregate and/or to measure a flow of water discharged from one or more of the individual water treatment vessels of the plurality of water treatment vessels 106. Reduced flow through the system 100 or an individual water treatment vessel of the plurality of water treatment vessels can indicate a blockage or other issue within the system 100 requiring maintenance or repair. Thus, in some embodiments, the controller 110 is configured to operate one or more of the plurality of valves 104 responsive to measurements from the flow sensors disposed at the system inlet 102, system outlet 108, and/or the inlets 106*a* or outlets 106*b* of the plurality of water treatment vessels 106 to direct water away from one or more of the plurality of water treatment vessels 106 where a flow rate from one or both of the system outlet 108 and an outlet 106*b* of one or more of the plurality of water treatment vessels 106 is below a predetermined threshold.

In some embodiments, the controller could be configured to operate one or more of the plurality of valves 104 responsive to the determination of exhaustion to direct water away from any water treatment vessel of the plurality of water treatment vessels that is exhausted. By "exhausted," it is meant that the treatment medium, e.g., ion exchange medium, within the water treatment vessel has reached it capacity for ion exchange and can no longer take up undesired ions and release less impactful ions. An exhausted water treatment vessel may be determined by one or both of physical measurement and chemical measurements of the water being discharged from the water treatment vessel. Water treatment media such as ion exchange media can become degraded over time, reducing flow through the water treatment vessel, with a concomitant increase in pressure needed to push water through the water treatment vessel, indicating that a removal from service is warranted. Similarly, the quality of the water being discharged from a water treatment vessel can be indicative of exhaustion of the water treatment medium, e.g., ion exchange medium, within. A water treatment vessel with an exhausted water treatment medium may discharge water of a lower quality than expected, e.g., based on a measurement from a conductivity sensor, a chemical species-specific sensor, a TOC sensor, a TDS sensor, conductivity sensor, flow sensor, or another chemical sensor, indicating that the water treatment vessel is in need of new water treatment medium or a maintenance cycle, e.g., flushing with brine. Similarly, the one or more sensors 112 positioned at the system inlet 102 and/or system outlet 108, if including chemical species-specific sensors, a TOC sensor, a TDS sensor, or another chemical sensor, can indicate that the system 100 has reached its treatment capacity by measurements of lower water quality than expected or desired. In these configurations, the system 100 can be taken out of service for maintenance and recharge of any water treatment media, e.g., ion exchange media, in the plurality of water treatment vessels 106.

The controller may be implemented using one or more computer systems. The computer system may be, for example, a general-purpose computer such as those based on an Intel CORE®-type processor, an Intel XEON®-type processor, an Intel CELERON®-type processor, an AMD FX-type processor, an AMD RYZEN®-type processor, an AMD EPYC®-type processor, and AMD R-series or G-series processor, or any other type of processor or combinations thereof. Alternatively, the computer system may include programmable logic controllers (PLCs), specially programmed, special-purpose hardware, for example, an application-specific integrated circuit (ASIC) or controllers intended for analytical systems. In some embodiments, the controller may be operably connected to or connectable to a user interface constructed and arranged to permit a user or operator to view relevant operational parameters of the system 100, adjust said operational parameters, and/or stop operation of the system 100 as needed. The user interface may include a graphical user interface (GUI) that includes a display configured to be interacted with by a user or service provider and output status information of the system 100.

The controller can include one or more processors typically connected to one or more memory devices, which can comprise, for example, any one or more of a disk drive memory, a flash memory device, a RAM memory device, or other device for storing data. The one or more memory devices can be used for storing programs and data during operation of the apparatus 100. For example, the memory device may be used for storing historical data relating to the parameters over a period of time. Software, including programming code that implements embodiments of the invention, can be stored on a computer readable and/or writeable nonvolatile recording medium, and then typically copied into the one or more memory devices wherein it can then be executed by the one or more processors. Such programming code may be written in any of a plurality of programming languages, for example, ladder logic, Python, Java, Swift, Rust, C, C#, or C++, G, Eiffel, VBA, or any of a variety of combinations thereof.

As disclosed herein, a water treatment system, e.g., as illustrated in FIGS. 1-4, need not be located in a centralized or otherwise static facility that delivers treated water over an existing distribution system such as a municipal piping grid. In some embodiments, the water treatment system can be a mobile platform that can be delivered to a specific location needing treated water and connected directly into the infrastructure between the incoming water supply of the location or water output from the location, and the demand of the location. For example, FIG. 5 illustrates an embodiment of a water treatment system, e.g., as illustrated in FIGS. 1-4, e.g., a system inlet 102, a first header 103*a*, a second header 103*b*, a plurality of valves 104, connections 105 between the first header 103*a* and second header 103*b*, plurality of water treatment vessels 106 fluidly coupled between the first header 103*a* and second header 103*b*, and a system outlet 108, housed within the internal space of a standard container trailer, e.g., a 53' box truck. In this configuration, the truck containing the water treatment system can be delivered to the location where treated water is needed. The system inlet of the water treatment system 102 can be connected to the feed water to the location, such as a municipal supply, a ground water supply, or other source of water, or to a processed water outlet at the location, and the system outlet 108 can be connected to an inlet of the demand, e.g., a building standpipe connection or the like. Upon completion of treated water production, the connections to the water treatment system can be disconnected and the truck moved to a different location, either for further treatment needs, maintenance, e.g., water treatment medium, e.g., ion exchange medium, replacement or recharging, or other uses.

In some embodiments, the water treatment vessels in a mobile platform can be delivered to a first treatment site without containing treatment media, and upon arrival at the first treatment site are charged with treatment media. The treatment media used to charge the water treatment vessels at the first treatment site can be chosen based on a determination of one or more properties of the water to be treated, e.g., chemical composition, and the water treatment vessels charged accordingly. Once treatment is complete at the first treatment site, the water treatment vessels can be emptied of used treatment media and the mobile platform delivered to a second, different treatment site. The treatment media used to charge the water treatment vessels at the second treatment site can be chosen based on a determination of one or more properties of the water to be treated, e.g., chemical composition, and the water treatment vessels charged accordingly.

It is contemplated that in this configuration, i.e., the system being housed within a mobile platform as illustrated in FIG. 5, each water treatment vessel 106 of the plurality of water treatment vessels 106 will be individually removable and serviceable from the system, such as by being able to be isolated using the plurality of valves 104 of the water distribution manifold 103 and removal of one or more water treatment vessels 106 from the mobile platform. With continued reference to FIG. 5, removal of one or more of the water treatment vessels from the mobile platform can be achieved by using moving devices known in the field, such as using wheelbases, rails, or other equivalent systems. For example, as illustrated in FIG. 5, each of the water treatment vessels 106 sits on a 114*b* platform that is movably connected to a rail system 114*a* connected to the floor of the box truck. In this configuration, each water treatment vessel 106 can be removed from the box truck by sliding along the rail system 114*a* to which its platform 114*b* is attached. Other removal systems are within the scope of this disclosure, and this disclosure is in no way limited by the type of removal system for the water treatment vessels.

In accordance with an aspect, there is provided a method of treating water. The method may include providing a water treatment system. The provided water treatment system may include a water distribution manifold connected to a system inlet and system outlet having a plurality of valves structured and arranged to provide a configurable flow path along the water distribution manifold. The provided water treatment system further may include a plurality of water treatment vessels each having an inlet and an outlet connected to the water distribution manifold. The water distribution manifold may provide for a uniform pressure drop across the plurality of water treatment vessels. The plurality of valves may be selectively operable to provide for sections of the water distribution manifold to switch between flowing water into one or more of the plurality of water treatment vessels or receiving water from the one or more of the plurality of water treatment vessels. The method may include measuring one or more water quality parameters from water from a source of water to be treated that is directed to the system inlet. The method further may include configuring a flow path of the water to be treated responsive to the one or more water quality parameters of the water to be treated. The method further may include treating the water to be treated using the plurality of water treatment vessels. The method additionally may include discharging a treated water from the system outlet.

In some embodiments, measuring one or more water quality parameters may include measuring one or more of water pressure, flow rate, conductivity, temperature, TOC, or a combination thereof. In other embodiments, measuring one or more water quality parameters may include measuring one or more of turbidity, a concentration of one or more chemical species, or a combination thereof.

In some embodiments, the method may include passing the water through water treatment vessels having one or more ion exchange media. In specific examples, the method may include passing the water through two or more groups of the plurality of water treatment vessels divided by the plurality of valves. The two or more groups of the plurality of water treatment vessels may include the same type of water treatment media. In specific embodiments, the method may include passing the water through the plurality of water treatment vessels arranged serially. Alternatively, in certain embodiments, the method may include passing the water through the plurality of water treatment vessels arranged in parallel.

In some embodiments, the method may include passing the water through the two or more groups of the plurality of water treatment vessels where the two or more groups having different types of water treatment media. In specific embodiments, the method may include passing the water through the plurality of water treatment vessels arranged serially. Alternatively, in certain embodiments, the method may include passing the water through the plurality of water treatment vessels arranged in parallel.

In further embodiments, the method may include configuring the flow path using the plurality of valves to direct water into a first group of water treatment vessels having a first water treatment media followed by a second group of water treatment vessels having a second water treatment media different than the first water treatment media.

In further embodiments, the method may include configuring the flow path using the plurality of valves to direct water into a first group of water treatment vessels followed by a second group of water treatment vessels, the first group of water treatment vessel comprising fewer water treatment vessels than the second group of water treatment vessels.

In further embodiments, the method may include configuring the flow path using the plurality of valves to direct water from the second group of water treatment vessels to a third group of water treatment vessels, the third group of water treatment vessel comprising fewer water treatment vessels than the second group of water treatment vessels.

In further embodiments, the method may include configuring the flow path using the plurality of valves to direct water from the second group of water treatment vessels to a third group of water treatment vessels, the third group of water treatment vessel comprising a greater number of water treatment vessels than the second group of water treatment vessels.

In some embodiments, the method may include configuring the flow path using the plurality of valves to direct water from water treatment vessels having exhausted treatment capacity.

In accordance with another aspect, a method of facilitating water treatment is disclosed. The method includes providing a water treatment train disposed on a mobile trailer, the water treatment train including a plurality of water treatment vessels, each of the water treatment vessels containing one of a plurality of types of treatment media. Each of the water treatment vessels includes respective inlets fluidly couplable to a first manifold header and to a second manifold header of a water distribution manifold and respective outlets fluidly couplable to the first manifold header and to the second manifold header of the water distribution manifold. The first manifold header includes a first isolation valve disposed to fluidly isolate respective inlets of a first group of the water treatment vessels and a second isolation valve disposed to fluidly isolate respective inlets of a third group of water treatment vessels. The second manifold header includes a third isolation valve disposed to fluidly isolate respective inlets of a second group of water treatment vessels. The method further includes selecting a plurality of water treatment vessels to be the first group of water treatment vessels based on the type of treatment media contained therein, selecting a plurality of water treatment vessels to be the second group of water treatment vessels based on the type of treatment media contained therein, and selecting a plurality of water treatment vessels to be the third group of water treatment vessels based on the type of treatment media contained therein. The method further includes coupling the water distribution manifold to a source of water to be treated at a first treatment site and establishing a first fluid circuit of the water to be treated through the first group of water treatment vessels, then through the second group of water treatment vessels, and then through the third group of water treatment vessels.

In some embodiments, at least a portion of the plurality of water treatment vessels are charged with treatment media at the first treatment site.

In some embodiments, the method further includes moving the mobile trailer to a second treatment site, coupling the water distribution manifold to a second source of water to be treated at the second treatment site, and establishing a second fluid circuit of the water to be treated through the second group of water treatment vessels and then through one of the first group of water treatment vessels and the third group of water treatment vessels.

In some embodiments, at least a portion of the plurality of water treatment vessels are charged with treatment media at the second treatment site.

In some embodiments, the second manifold header further includes a fourth isolation valve disposed to fluidly isolate respective inlets of a fourth group of water treatment vessels.

In some embodiments, the method further includes selecting a plurality of water treatment vessels to be the fourth group of water treatment vessels based on the type of treatment media contained therein.

In some embodiments, establishing the first fluid circuit of the water to be treated further includes directing water through the fourth group of water treatment vessels after the water is directed through the third group of water treatment vessels.

EXAMPLES

The function and advantages of these and other embodiments can be better understood from the following examples. These examples are intended to be illustrative in nature and are not considered to be in any way limiting the scope of the invention.

Prophetic Example 1

Figure 2:
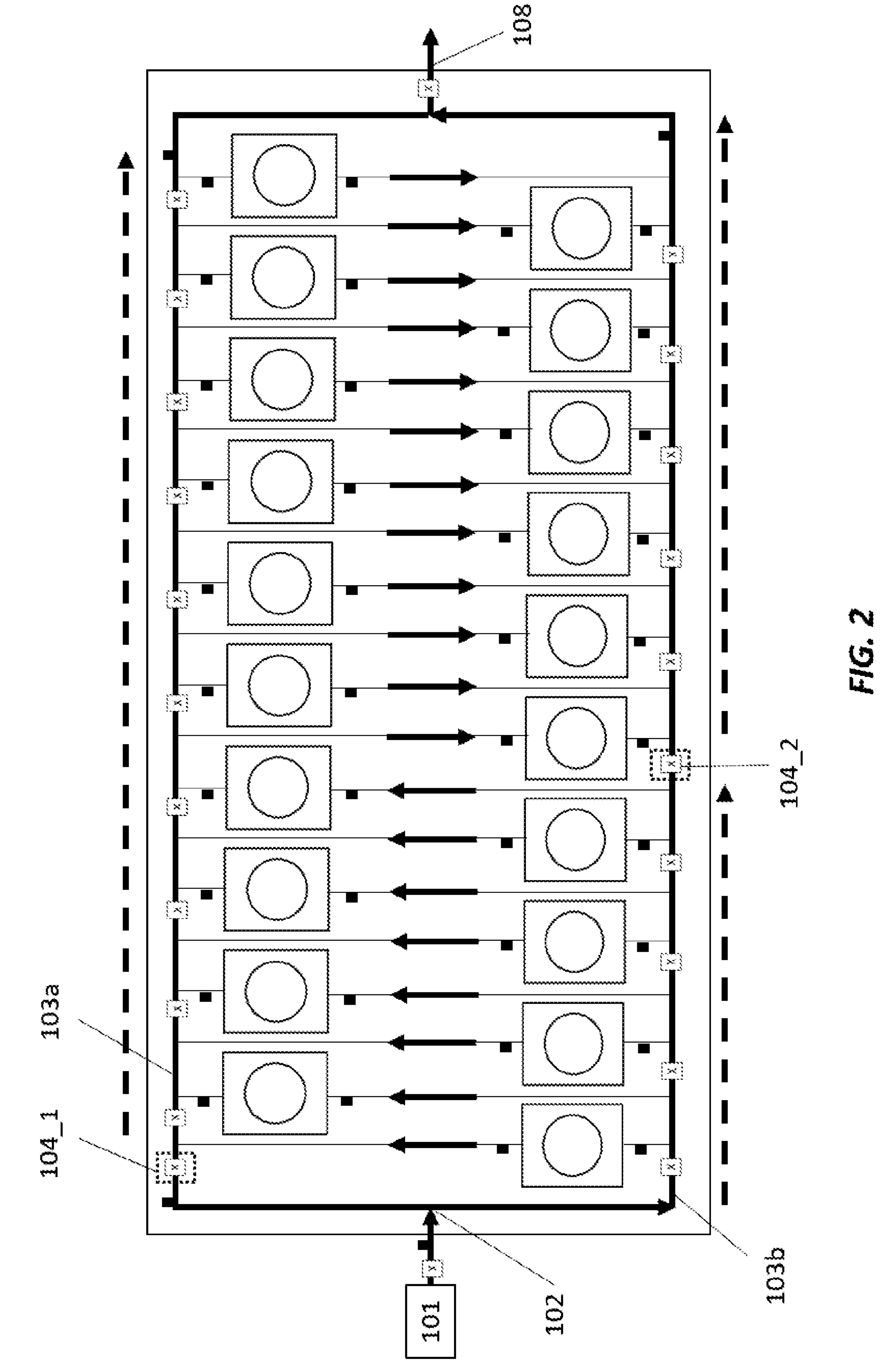
FIG. 2 illustrates the system of FIG. 1 with the plurality of water treatment vessels divided into two groups.

FIG. 2 illustrates an example of a two-stage mobile water treatment system based on the system illustrated in FIG. 1. For clarity, the components of FIG. 2 are not labeled but are identical to those illustrated in FIG. 1. The overall water flow of the system is shown using the dashed arrows.

In operation, water is directed from source of water 101 into system inlet 102. Valves 104_1 and 104_2, outlined in the black dotted line boxes, are closed and all remaining valves of the plurality of valves 104 are open. In this configuration, i.e., with valve 104_1 closed, water flows into second header **103*b* until it hits closed valve 104_2, whose closure defines the first group of vessels. Since valve 104_2 is closed, the water will flow from the second header 103*b* to first header 103*a* through the vessels shown by the up-pointing arrows. As valve 104_2 is closed, the water will flow from the first header 103*a* to the second header 103*b* through the second group of vessels. The number of individual vessels within each of two or more groups can be varied based on at least the composition of the feed water and the desired quality of water to be discharged. The now treated water is then discharged from the system via system outlet 108**.

The water treatment media within the vessels of the mobile water treatment system can be of any configuration. For example, the vessels connected to the first header **103*a* may each of one type of water treatment media and the vessels connected to the second header 103*b* may each be the same chemistry but different than those of the vessels connected to the first header 103*a*. In this configuration, the plurality of valves can be adjusted to have water flow into only the vessels of the first header 103*a* then direct the water to flow into only the vessels of the second header 103*b*. In a different configuration, the vessels of the first group, i.e., the vessels where water flows from the second header 103*b* to the first header 103*a*, may each be of one type of water treatment media and the vessels of the second group, i.e., the vessels where water flows from the first header 103*a* to the second header 103*b***, may each be of one type of water treatment media different than that of the first group of vessel. In a further different configuration, all vessels in the system may include mixed media.

Prophetic Example 2

Figure 3:
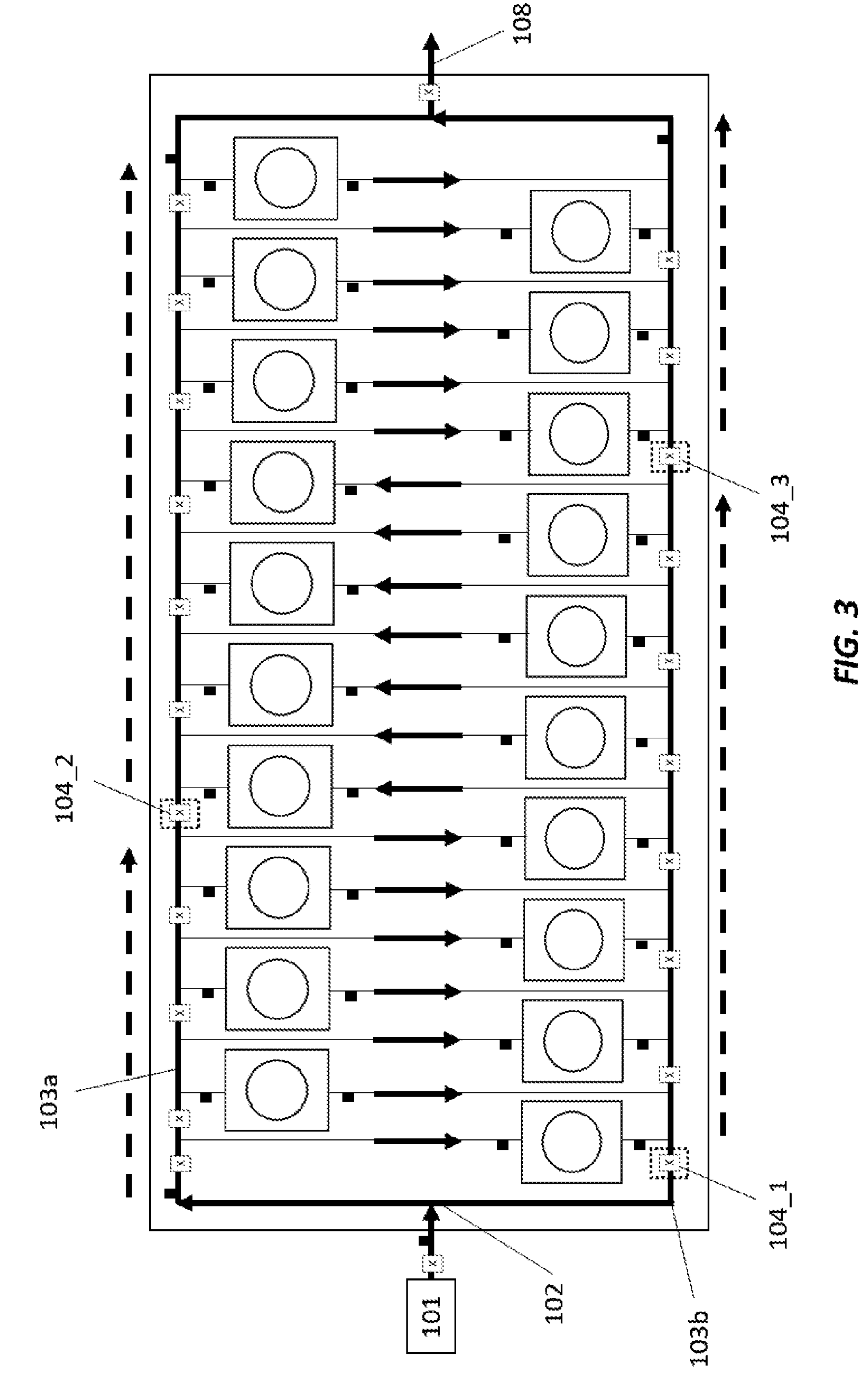
FIG. 3 illustrates the system of FIG. 1 with the plurality of water treatment vessels divided into three groups.

FIG. 3 illustrates an example of a three-stage mobile water treatment system based on the system illustrated in FIG. 1. For clarity, the components of FIG. 3 are not labeled but are identical to those illustrated in FIG. 1. The overall water flow of the system is shown using the dashed arrows.

In operation, water is directed from source of water 101 into system inlet 102. Valves 104_1, 104_2, and 104_3, outlined in the black dotted line boxes, are closed and all remaining valves of the plurality of valves 104 are open. In this configuration, i.e., with valve 104_1 closed, water will flow into first header 103*a* until it hits closed valve 104_2, whose closure defines the first group of vessels. Since valve 104_2 is closed, the water will flow from the first header 103*a* to second header 103*b* through the vessels of the first group as shown by the down pointing arrows. As valve 104_3 is closed, the water from the first group of vessels will flow from the second header 103*b* to the first header 103*a* through the vessels of the second group as shown by the up-pointing arrows. The water will further flow from the first header 103*a* to the second header 103*b* through the third group of vessels. The number of individual vessels within each of two or more groups can be varied based on at least the composition of the feed water and the desired quality of water to be discharged. The now treated water will then discharged from the system via system outlet 108.

The water treatment media within the vessels of the mobile water treatment system can be of any configuration. For example, the vessels connected to the first header 103*a* may each of one type of water treatment media and the vessels connected to the second header 103*b* may each be the same chemistry but different than those of the vessels connected to the first header 103*a*. In this configuration, the plurality of valves can be adjusted to have water flow into only the vessels of the first header 103*a* then direct the water to flow into only the vessels of the second header 103*b*. In a different configuration, the vessels of the first group, i.e., the vessels where water flows from the second header 103*b* to the first header 103*a*, may each be of one type of water treatment media, the vessels of the second group, i.e., the vessels where water flows from the first header 103*a* to the second header 103*b*, may each be of one type of water treatment media different than that of the first group of vessel, and the vessels of the third group, i.e., the vessels where water flows from the second header 103*b* to the first header 103*a*, may each be of one type of water treatment media, may each be of one type of water treatment media different than that of the first group of vessels or second group of vessels. In a further configuration, the vessels of the third group, i.e., the vessels where water flows from the second header 103*b* to the first header 103*a*, may include the same water treatment media as one of the first group of vessels or the second group of vessels. In a further different configuration, all vessels in the system may include mixed media.

Prophetic Example 3

Figure 4:
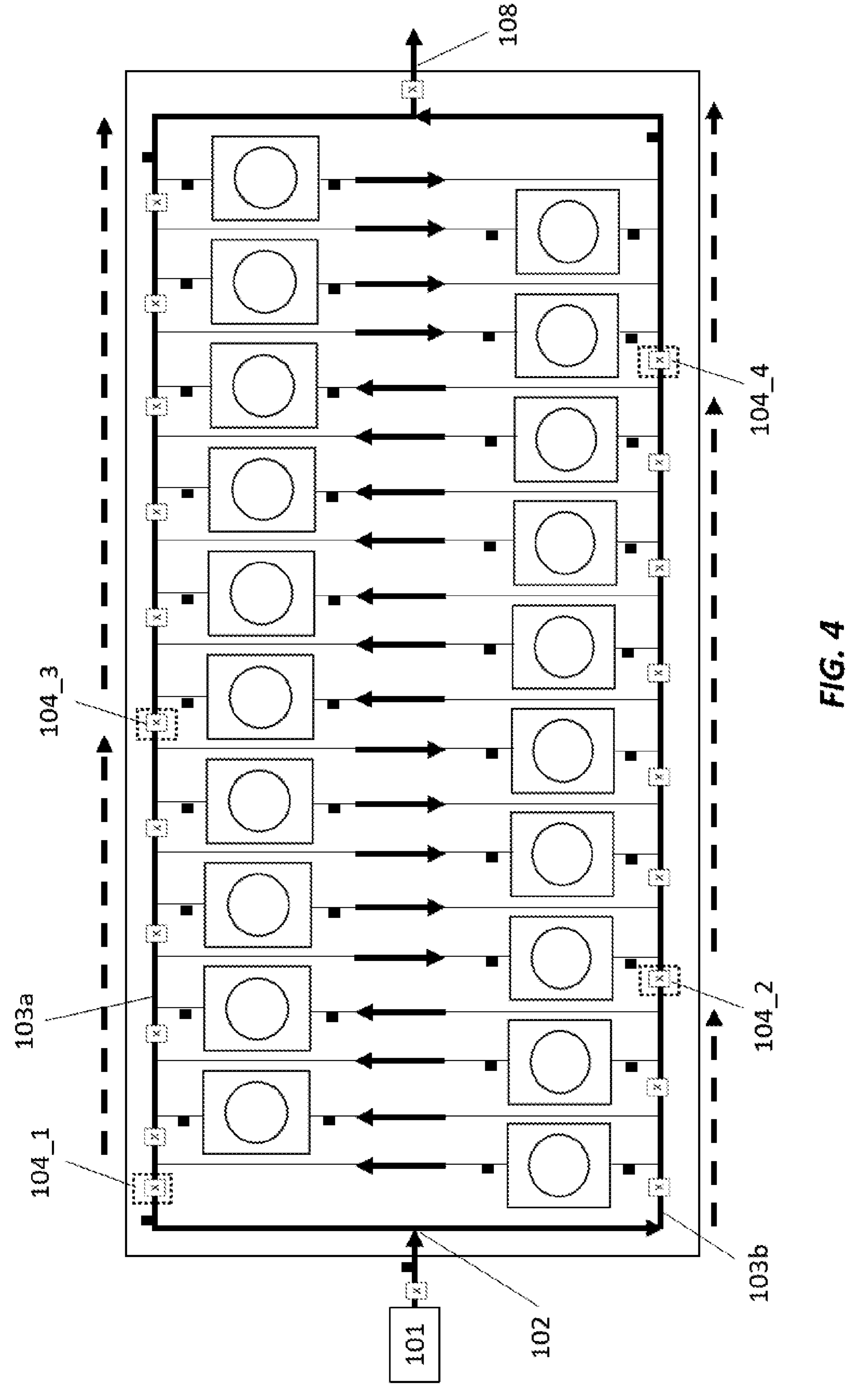
FIG. 4 illustrates the system of FIG. 1 with the plurality of water treatment vessels divided into four groups.
Figure 5:
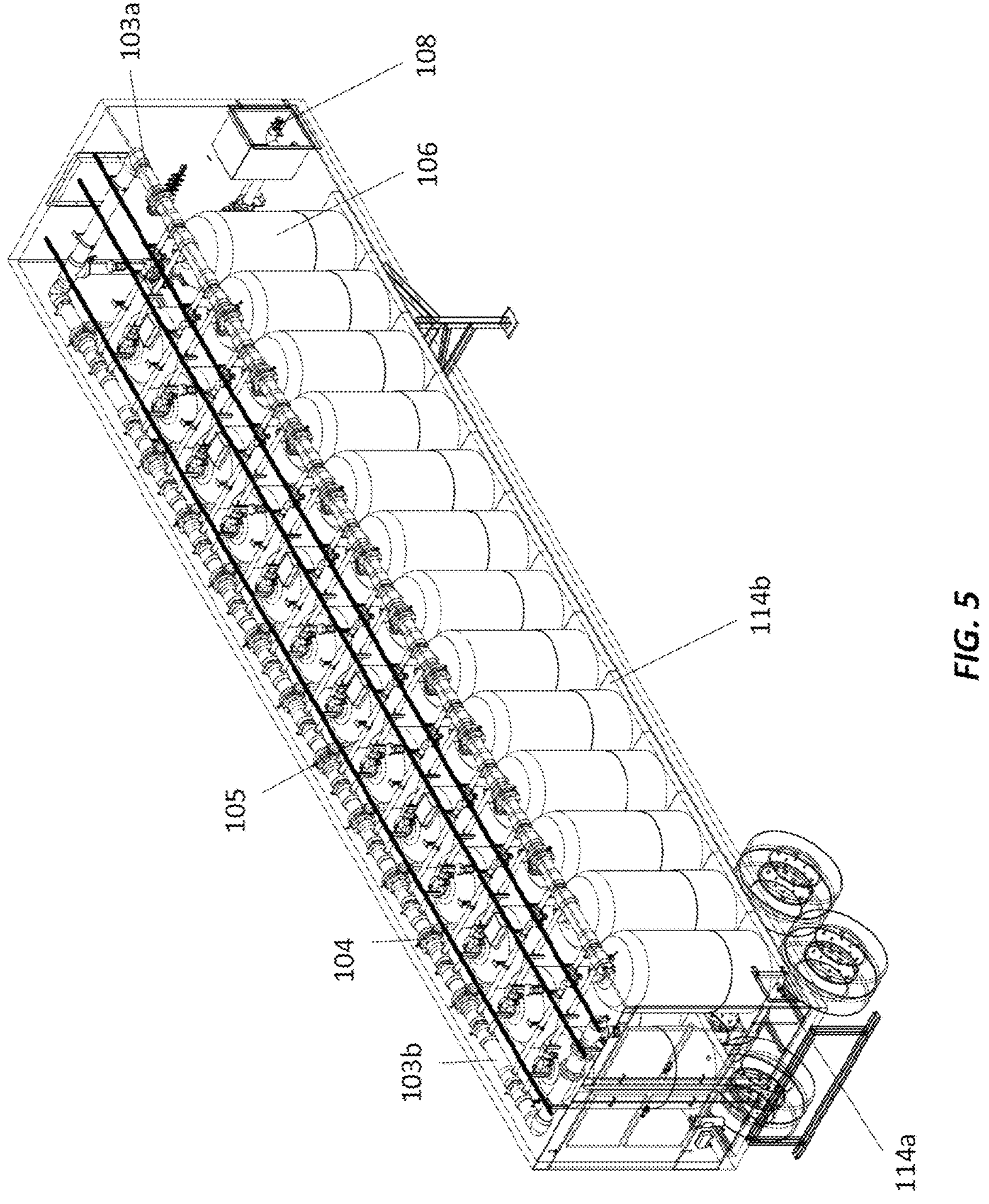
FIG. 5 illustrates the system of FIG. 1 positioned within the area of a 53' container truck.

FIG. 4 illustrates an example of a four-stage mobile water treatment system based on the system illustrated in FIG. 1. For clarity, the components of FIG. 4 are not labeled but are identical to those illustrated in FIG. 1. The overall water flow of the system is shown using the dashed arrows.

In operation, water is directed from source of water 101 into system inlet 102. Valves 104_1, 104_2, 104_3, and 104_4, outlined in the black dotted line boxes, are closed and all remaining valves of the plurality of valves 104 are open. In this configuration, i.e., with valve 104_1 closed, water will flow into second header 103*b* until it hits closed valve 104_2, whose closure defines the first group of vessels. Since valve 104_2 is closed, the water will flow from the second header 103*b* to the first header 103*a* and through all vessels in the first group as shown by the up-pointing arrows. The water will flow towards valve 104_3, whose closure defines the second group of vessels. As valve 104_3 is closed, the water will flow from the first header 103*a* to the second header 103*b* and through all vessels in the second group as shown by the down pointing arrows. The water will flow towards valve 104_4, whose closure defines the third and fourth groups of vessels. As valve 104_4 is closed, the water will flow from the second header 103*b* to the first header 103*a* and through all vessels in the third group as shown by the up-pointing arrows. The water will further flow from the first header 103*a* to the second header 103*b* and through all vessels in the fourth group as shown by the down pointing arrows. The number of individual vessels within each of two or more groups can be varied based on at least the composition of the feed water and the desired quality of water to be discharged. The now treated water is then discharged from the system via system outlet 108.

The water treatment media within the vessels of the mobile water treatment system can be of any configuration. For example, the vessels connected to the first header 103*a* may each of one type of water treatment media and the vessels connected to the second header 103*b* may each be the same chemistry but different than those of the vessels connected to the first header 103*a*. In this configuration, the plurality of valves can be adjusted to have water flow into only the vessels of the first header 103*a* then direct the water to flow into only the vessels of the second header 103*b*. In a different configuration, the vessels of the first group, i.e., the vessels where water flows from the second header 103*b* to the first header 103*a*, may each be of one type of water treatment media, the vessels of the second group, i.e., the vessels where water flows from the first header 103*a* to the second header 103*b*, may each be of one type of water treatment media different than that of the first group of vessels, the vessels of the third group, i.e., the vessels where water flows from the second header 103*b* to the first header 103*a*, may each be of one type of water treatment media different than that of the first group of vessels or second group of vessels, and the vessels of the fourth group, i.e., the vessels where water flows from the first header 103*a* to the second header 103*b*, may each be of one type of water treatment media different than that of the first, second, or third groups of vessels. In a further configuration, the vessels of the fourth group, i.e., the vessels where water flows from the first header 103*a* to the second header 103*b*, may include the same water treatment media as one of the first group of vessels, the second group of vessels, or the third group of vessels. In a further different configuration, all vessels in the system may include mixed media.

Prophetic Example 4

In any system illustrated in FIGS. 1-4, it is believed that knowledge of the composition of the water from the source of water, i.e., chemical composition, conductivity, pH, or temperature, will be used to determine the flow path of water through the mobile water treatment system. The plurality of valves and the water treatment media within each water treatment vessel, taken with knowledge of the location where the mobile water treatment system is to be deployed and the desired quality of water from the system, can be adjusted to provide for a flow path through the system that maximizes flow of water from the outlet, water quality, hydraulic pressure within the vessels and water distribution manifold, and treatment efficiency.

In an example, a system as illustrated in FIGS. 1-4 can be expected to treat a feed water having a TDS of 10-500 ppm, 0.5 ppm chlorine, and turbidity of less than one NTU and produce a treated water having a conductivity of less than 0.1 mS and a $SiO_2$ concentration of less than 10 ppb.

The phraseology and terminology used herein is for the purpose of description and should not be regarded as limiting. As used herein, the term “plurality” refers to two or more items or components. The terms “comprising,” “including,” “carrying,” “having,” “containing,” and “involving,” whether in the written description or the claims and the like, are open-ended terms, i.e., to mean “including but not limited to.” Thus, the use of such terms is meant to encompass the items listed thereafter, and equivalents thereof, as well as additional items. Only the transitional phrases “consisting of” and “consisting essentially of,” are closed or semi-closed transitional phrases, respectively, with respect to the claims. Use of ordinal terms such as “first,” “second,” “third,” and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A water treatment system, comprising:

a system inlet connectable to a source of water to be treated;

a water distribution manifold connected to the system inlet and including a plurality of valves structured and arranged to provide a configurable flow path along the water distribution manifold, the water distribution manifold including a first branch and a second branch;

a plurality of water treatment vessels each having an inlet and an outlet connected to the water distribution manifold and fluidly coupled between the first branch and the second branch, the water distribution manifold providing for a uniform pressure drop across the plurality of water treatment vessels, the plurality of valves selectively operable to provide for sections of the water distribution manifold to switch between flowing water into one or more of the plurality of water treatment vessels or receiving water from the one or more of the plurality of water treatment vessels; and a system outlet connected to the outlet of a last of the plurality of water treatment vessels, the first branch and the second branch each in direct fluid communication with both the system inlet and the system outlet.

2. The water treatment system of claim 1, wherein the plurality of valves are further selectively operable to provide for the configurable flow path to be modified to change connections between the plurality of water treatment vessels from series to parallel and from parallel to series.

3. The water treatment system of claim 2, wherein the plurality of valves permit the plurality of water treatment vessels to be divided into two or more groups each comprising a subset of the plurality of water treatment vessels.

4. The water treatment system of claim 3, wherein the plurality of valves permits the plurality of water treatment vessels to be divided into at least three groups of water treatment vessels.

5. The water treatment system of claim 4, wherein the plurality of water treatment vessels comprise one or more ion exchange media.

6. The water treatment system of claim 5, wherein the one or more ion exchange media comprises one or more of cation exchange media, anion exchange media, and mixed ion exchange media.

7. The water treatment system of claim 3, wherein inlets of a first group of the plurality of water treatment vessels are connected to the first branch and inlets of a second group of the plurality of water treatment vessels are connected to the second branch.

8. The water treatment system of claim 1, comprising to one or more sensors disposed at the system inlet, one or more sensors disposed at the system outlet, and/or one or more sensors disposed at the inlets or outlets of the plurality of water treatment vessels.

9. The water treatment system of claim 8, wherein the one or more sensors disposed at the system inlet, system outlet, and the inlets or outlets of the plurality of water treatment vessels comprise a pressure sensor, a flow sensor, a conductivity sensor, a temperature sensor, or a combination thereof.

10. The water treatment system of claim 8, wherein the one or more sensors disposed at the system inlet and system outlet comprises pressure sensors constructed and arranged to measure a pressure differential across the water treatment system.

11. The water treatment system of claim 8, wherein the one or more sensors disposed at the system inlet and system outlet comprises flow sensors constructed and arranged to measure a flow of water discharged from the water treatment system.

12. The water treatment system of claim 8, wherein the one or more sensors disposed at the system inlet and system outlet comprises conductivity sensors constructed and arranged to measure a conductivity of water discharged from the water treatment system.

13. A method of treating water, comprising:

providing a water treatment system comprising:

a water distribution manifold connected to a system inlet and system outlet and including a plurality of valves structured and arranged to provide a configurable flow path along the water distribution manifold, the water distribution manifold including a first branch and a second branch, the first branch and the second branch each in direct fluid communication with both the system inlet and the system outlet; and a plurality of water treatment vessels each having an inlet and an outlet connected to the water distribution manifold and fluidly coupled between the first branch and the second branch, the water distribution manifold providing for a uniform pressure drop across the plurality of water treatment vessels, the plurality of valves selectively operable to provide for sections of the water distribution manifold to switch between flowing water into one or more of the plurality of water treatment vessels or receiving water from the one or more of the plurality of water treatment vessels; and measuring one or more water quality parameters from water from a source of water to be treated that is directed to the system inlet;

configuring a flow path of the water to be treated responsive to the one or more water quality parameters of the water to be treated;

treating the water to be treated using the plurality of water treatment vessels; and discharging a treated water from the system outlet.

14. The method of claim 13, wherein measuring one or more water quality parameters includes measuring one or more of water pressure, flow rate, conductivity, or a combination thereof.

15. The method of claim 14, including passing the water through water treatment vessels comprising one or more ion exchange media.

16. The method of claim 15, including passing the water through two or more groups of the plurality of water treatment vessels divided by the plurality of valves.

17. The method of claim 16, including passing the water through the two or more groups of the plurality of water treatment vessels where the two or more groups comprise the same type of water treatment media.

18. The method of claim 16, including passing the water through the two or more groups of the plurality of water treatment vessels where the two or more groups comprise different types of water treatment media.

19. The method of claim 18, comprising configuring the flow path using the plurality of valves to direct water into a first group of water treatment vessels having a first water treatment media followed by a second group of water treatment vessels having a second water treatment media different than the first water treatment media.

20. The method of claim 18, comprising configuring the flow path using the plurality of valves to direct water into a first group of water treatment vessels having a first water treatment media followed by a second group of water treatment vessels having a second water treatment media the same as the first water treatment media.

21. The method of claim 16, further comprising configuring the flow path using the plurality of valves to direct water into a first group of water treatment vessels followed by a second group of water treatment vessels, the first group of water treatment vessel comprising fewer water treatment vessels than the second group of water treatment vessels.

22. The method of claim 21, further comprising configuring the flow path using the plurality of valves to direct water from the second group of water treatment vessels to a third group of water treatment vessels, the third group of water treatment vessel comprising fewer water treatment vessels than the second group of water treatment vessels.

23. The method of claim 21, further comprising configuring the flow path using the plurality of valves to direct water from the second group of water treatment vessels to a third group of water treatment vessels, the third group of water treatment vessel comprising a greater number of water treatment vessels than the second group of water treatment vessels.

* * * * *